(12) United States Patent
Wilson (10) Patent No.: US 12,024,082 B2
(45) Date of Patent: Jul. 2, 2024

(54) MOUNTABLE, POWERED KAYAK LOADER AND CARRIER STRUCTURE

(71) Applicant: Jeffrey A. Wilson, Pennsboro, WV (US)

(72) Inventor: Jeffrey A. Wilson, Pennsboro, WV (US)

( * ) Notice: Subject to any disclaimer, the term of this patent is extended or adjusted under 35 U.S.C. 154(b) by 36 days.

(21) Appl. No.: 18/050,059

(22) Filed: Oct. 27, 2022

(65) Prior Publication Data

US 2024/0140295 A1 May 2, 2024

(51) Int. Cl.
*B60P 3/10* (2006.01)

(52) U.S. Cl.
CPC .................. *B60P 3/1025* (2013.01)

(58) Field of Classification Search
CPC ......... B60P 3/1033; B60P 3/1058; B60P 3/08; B60P 3/1025; B60P 3/06; B60P 1/435; B60P 1/4407; B60P 3/07; B60P 3/1008
USPC ......................................................... 414/462
See application file for complete search history.

(56) References Cited

U.S. PATENT DOCUMENTS

| | | | | |
|---|---|---|---|---|
| 3,708,081 A * | 1/1973 | Schladenhauffen | .. | B60P 3/1025 414/538 |
| 3,809,266 A * | 5/1974 | Salerni | .................. | B60P 3/1025 414/522 |
| 3,872,989 A * | 3/1975 | Smithson | .............. | B60P 3/1025 254/128 |
| 4,420,165 A * | 12/1983 | Goodin | .................. | B60P 3/1033 280/414.1 |
| 5,069,595 A * | 12/1991 | Smith | ................... | B60P 3/1025 414/559 |
| 5,603,600 A * | 2/1997 | Egan | ...................... | B60P 3/1058 414/478 |
| 5,984,614 A * | 11/1999 | Weber | ..................... | B60P 3/125 414/547 |
| 6,390,761 B1 * | 5/2002 | Palmer, Jr. | .............. | B60P 1/433 414/537 |
| 6,981,835 B1 * | 1/2006 | Groth | ...................... | B60P 3/062 414/537 |
| 7,581,917 B1 * | 9/2009 | Depagter | .................. | B60P 3/40 296/3 |
| 8,133,000 B2 * | 3/2012 | Olson | ................... | B60P 3/1025 224/310 |
| 10,358,073 B2 * | 7/2019 | Lai | ............................ | B60R 9/12 |
| 10,464,495 B2 * | 11/2019 | Mercurio | ................ | B60R 9/042 |

(Continued)

*Primary Examiner* — Gregory W Adams
(74) *Attorney, Agent, or Firm* — Jaensson Law PLLC; Monika Jaensson (57) ABSTRACT

A truck mountable kayak loader and carrier including a support frame having a front frame, a back frame, and a pair of side rails. Rotatably affixed to the back frame is a kayak support structure having a pair of telescoping rails, with a winch support structure secured at and between one of the ends of the telescoping rails and a pull bar secured at and between the other ends of the telescoping rails. A telescoping cylinder is provided to raise and lower the front end of the kayak support structure relative to the support frame, and a winch system is provided to pull the kayak onto the kayak support system. Also provide is a kayak support structure for mounting on a carrier or storage structure. Further, methods of loading a kayak onto a truck or kayak support structure are provided, using the disclosed technology.

18 Claims, 11 Drawing Sheets

(56) References Cited

U.S. PATENT DOCUMENTS 10,889,229 B2 * 1/2021 Frost .................. B60R 9/08
2007/0177964 A1 * 8/2007 Bosela ............... B60P 3/1008
                                                                                           224/310

* cited by examiner

MOUNTABLE, POWERED KAYAK LOADER AND CARRIER STRUCTURE

FIELD OF THE INVENTION

The disclosed technology regards a mountable, powered kayak loader and carrier or storage structure, suitable for use on a pickup truck, trailer or as a stationary device, and a method of loading kayaks onto a carrier or storage structure.

BACKGROUND OF THE INVENTION

The average recreational single kayak weighs about 35 pounds, and tandem kayaks weigh about 65 pounds, while fishing kayaks can get up to over 120 pounds. Loading and unloading these kayaks, especially tandem and fishing kayaks, into the bed of a truck, or onto a trailer or storage structure, is a cumbersome and strenuous activity, and can cause wear and tear to the kayak. Often older and single individuals have insufficient strength and/or dexterity to load and unload their kayak, and therefore may refrain from solitary fishing or recreational boating excursions. Furthermore, when using a boat trailer, the same prohibits also towing a camper with the same vehicle for vacations.

Therefore, there is a need for an organized and motorized system to retrieve kayaks from the water or ground, onto a carrier positioned on the bed of a truck, as a trailer, or another storage structure at a dock, in a garage or similar facility, or on a boat, thereby facilitating easy loading thereof for transport or storage, limiting wear and tear and the kayak, and even allowing the kayak to be loaded for storage or transport with fishing equipment and other accessories remaining with the kayak rather than being disassembled.

GENERAL DESCRIPTION

Provided herein, through embodiments hereinafter set forth and drawings provided, is a truck mountable, motorized kayak loader and carrier and a method of loading kayaks onto a truck. Furthermore, elements of the disclosed technology can be adapted for use in loading kayaks on a trailer or another storage structure.

The truck mountable kayak loader and carrier of the disclosed technology includes a support frame having a front frame, a back frame, and a pair of side rails, wherein the front frame and the back frame are respectively affixed to opposing ends of the side rails. Rotatably affixed to the back frame is a kayak support structure having a pair of telescoping rails, with a winch support structure secured at and between one of the ends of the telescoping rails and a pull bar secured at and between the other ends of the telescoping rails.

To raise and lower the front end of the kayak support structure relative to the support frame, a powered telescoping cylinder system is rotatably affixed at one end to the support frame, and rotatably affixed at the other end to the kayak support structure. Further, to provide pulling force on the kayak in the loading thereof, a winch system (supported on the winch support structure) is provided, including a motorized pulley drum, a lower pulley, an upper pulley, and a cable, wherein one end of the cable is secured to the motorized pulley drum, winds about the lower and upper pulleys, and terminates with a clip. In this configuration, winding the pulley drum in one direction extends the length of workable cable, and winding it in the opposite direction shortens the length of workable cable.

The disclosed technology further provides a kayak support structure which may be mounted on another transport or storage frame, wherein the kayak support structure includes a pair of rails and a winch support structure secured at and between one end of the rails. A winch system is provided on the winch support structure, including a motorized pulley drum, a lower pulley, an upper pulley and a cable, wherein one end of the cable is secured to the motorized pulley drum, winds about the lower and upper pulleys, and terminates with a clip. In this configuration, the rails may or may not be telescoping, and the kayak support structure may be affixed to the transport or storage frame in a stationary or in an adjustable position.

Further, the disclosed technology provides a method for loading a kayak onto a pickup truck, wherein a support frame of a truck mountable kayak loader and carrier is secured to the bed of the truck, the support frame including a front frame, a back frame, and a pair of side rails, wherein the front and back frames are affixed to opposing ends of the side rails. A front end of a kayak support structure rotatably coupled with the back frame of the support frame is then raised to a raised position by means of a telescoping cylinder system rotatably affixed to each of the support frame and the kayak support structure. Thereafter, the telescoping rails of the kayak support structure are extended into an extended position by means of, for example, a pull bar at the end of the telescoping rails. A working end of a cable of a motorized winch system is then secured to a kayak aligned with the kayak support structure, and by operating the winch system the kayak is pulled onto the kayak support structure until it is fully loaded. Finally, once the kayak is fully loaded onto the kayak support structure, the telescoping rails are then returned to a retracted position and the kayak support structure is returned to a lowered position. The method may be repeated or simultaneously performed with a second kayak and second kayak support structure.

Similarly, the disclosed technology provides a method for loading a kayak onto another transport or storage frame by means of a kayak support structure of the disclosed technology coupled therewith. The method includes affixing a working end of a cable of a winch system integral with the kayak support structure to a kayak aligned with the kayak support structure, and operating the winch system so that the kayak is pulled onto the kayak support structure until it is fully loaded. In this method, the kayak support structure may or may not be configured to assume multiple positions (e.g., raised and lowered positions) relative to the frame, and the rails thereof may or may not be telescoping; when either or both is present, the method may include positioning the kayak support structure into a raised and/or extended position for loading the kayak, and the lowered and/or retracted position for storage/transport.

DETAILED DESCRIPTION

The detailed description set forth below in connection with the appended drawings is intended as a description of various embodiments of the invention and is not intended to represent the only embodiments in which the invention may be practiced. The detailed description includes specific details for the purpose of providing a thorough understanding of the invention. However, it will be apparent to those skilled in the art that the invention may be practiced without these specific details, or with equivalents thereof. Elements and features of some embodiments may be incorporated into other embodiments, although not specifically referenced herein.

FIGS. 1-5, 6A and 7, illustrate an embodiment of a truck mountable kayak loader and carrier in accordance with the principles of the present invention. One of ordinary skill will recognize that the materials and manufacture of such a loader and carrier will be such that they can withstand the forces and weight of supporting one or more kayaks, traveling over a road, and with portions thereof being periodically submerged in water. Thus, lightweight but strong and sturdy materials such as metal, wood, polymers, plastics and the like can be used for various portions of the loader and carrier of the disclosed technology; tubular aluminum would provide a durable, lightweight, material for various of the structural components of the disclosed technology.

The truck mountable kayak loader and carrier includes a support frame 10, having a front frame 11, a back frame 12, and a pair of side rails 13, wherein the side rails are affixed at their ends to opposing sides of each of the front and back frames, respectively. As shown in FIGS. 1-5, 6A and 7, rotatably coupled with the support frame 10 are one or more kayak support structures 20, each having telescoping rails 21 to receive and support one or more kayaks.

Figure 1:
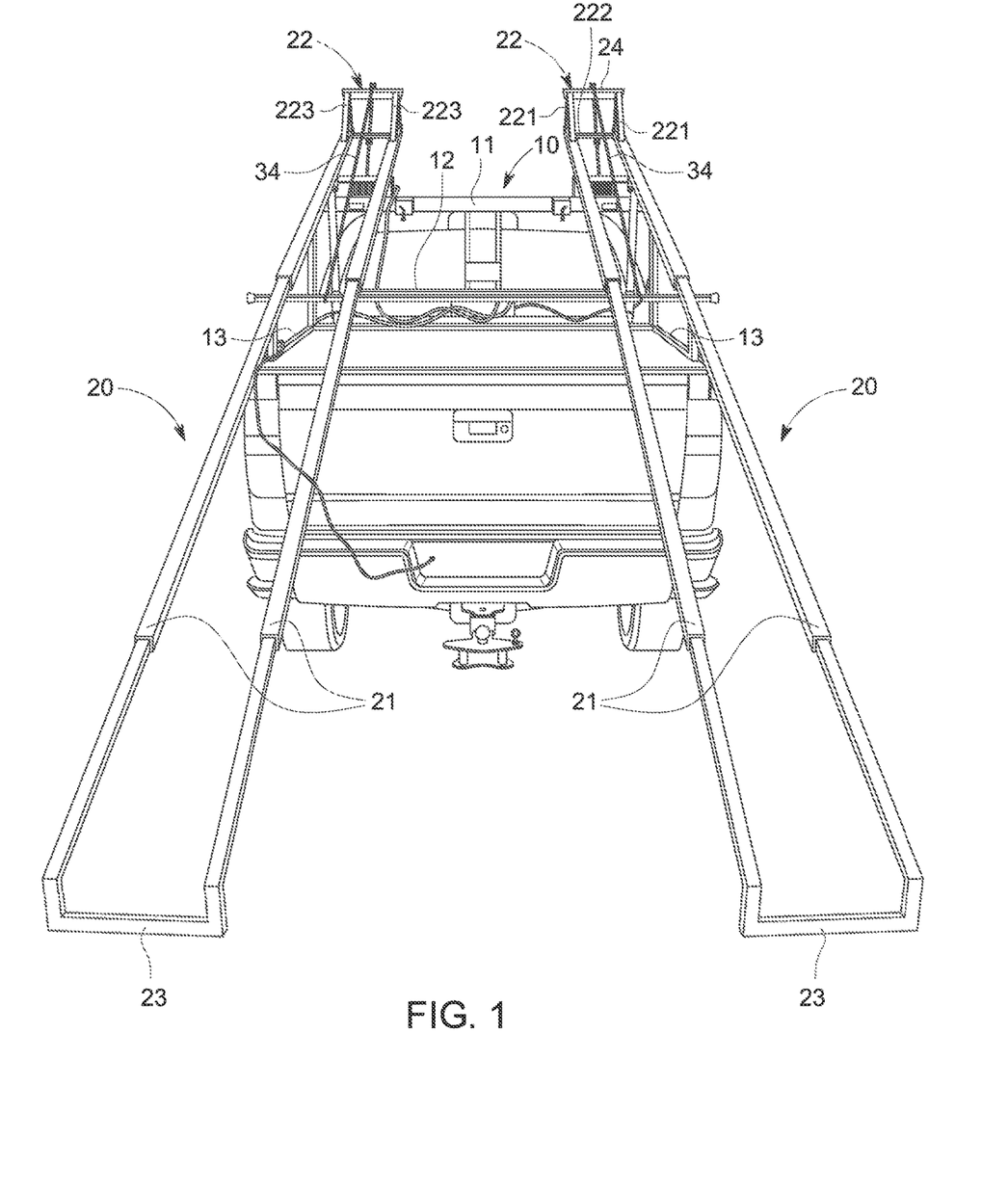
FIG. 1 is a front view of an embodiment of the truck mountable kayak loader and carrier of the disclosed technology, in its raised and extended position, secured on a truck bed.
Figure 2:
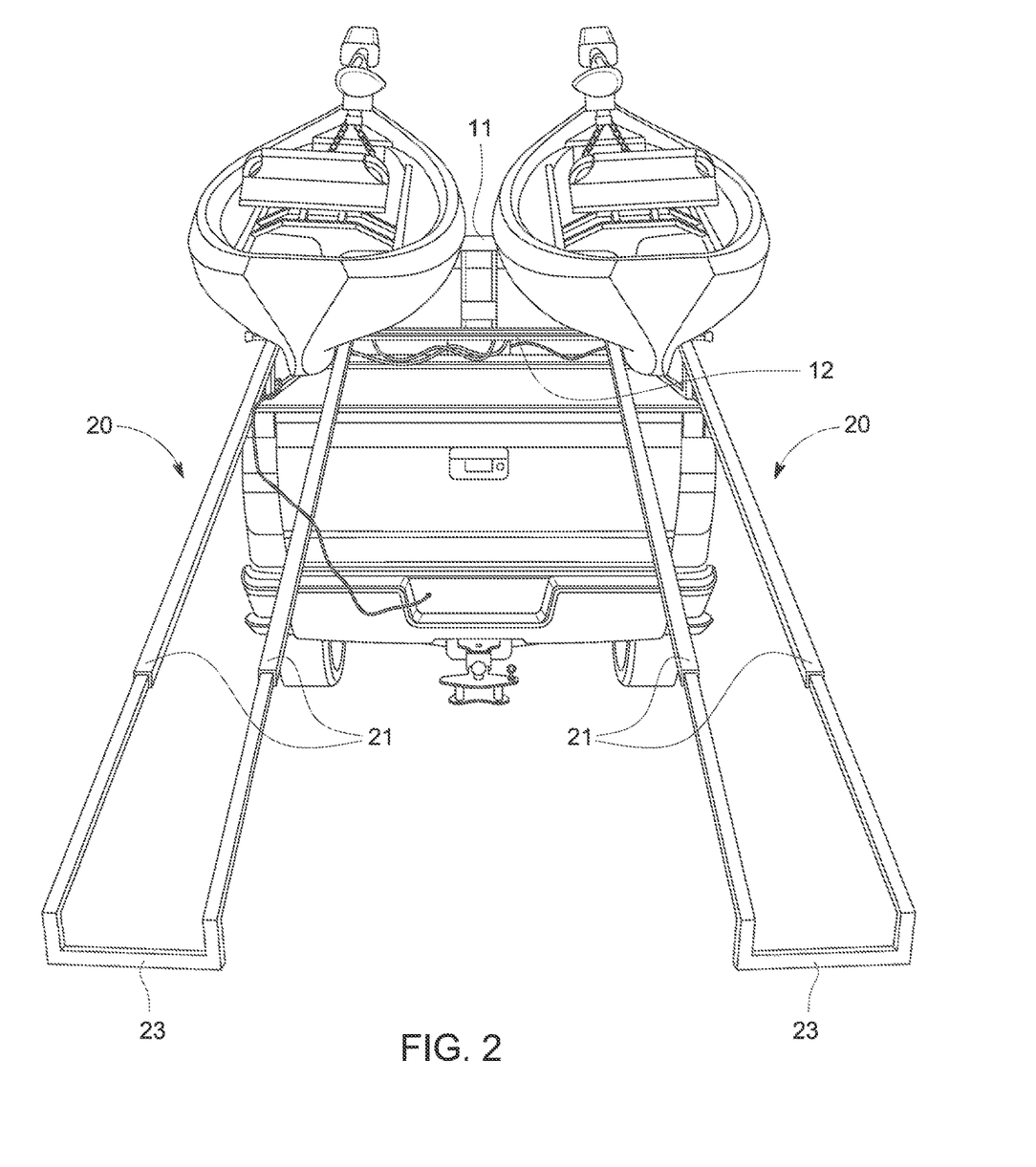
FIG. 2 is a front view of the embodiment of FIG. 1, with kayaks loaded thereon.
Figure 3:
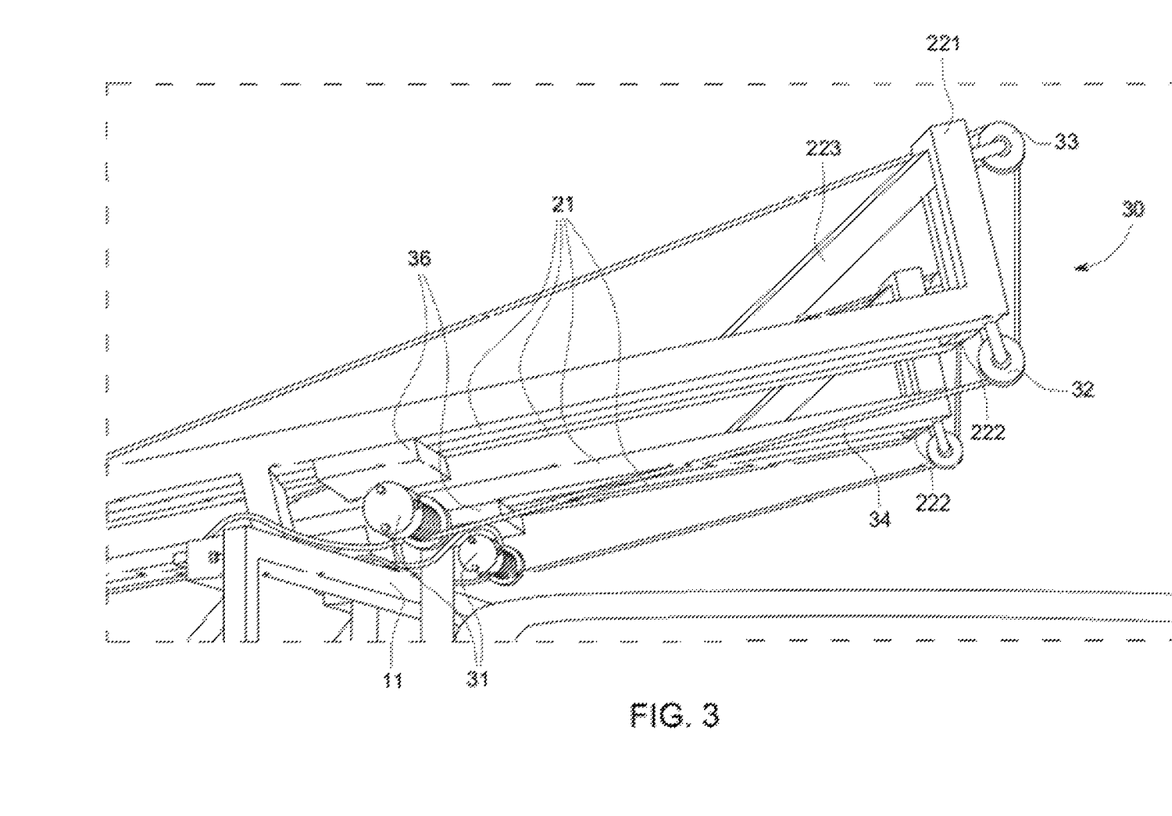
FIG. 3 is a peripheral view of the front end of the embodiment of FIG. 1, in its lowered position.
Figure 4:
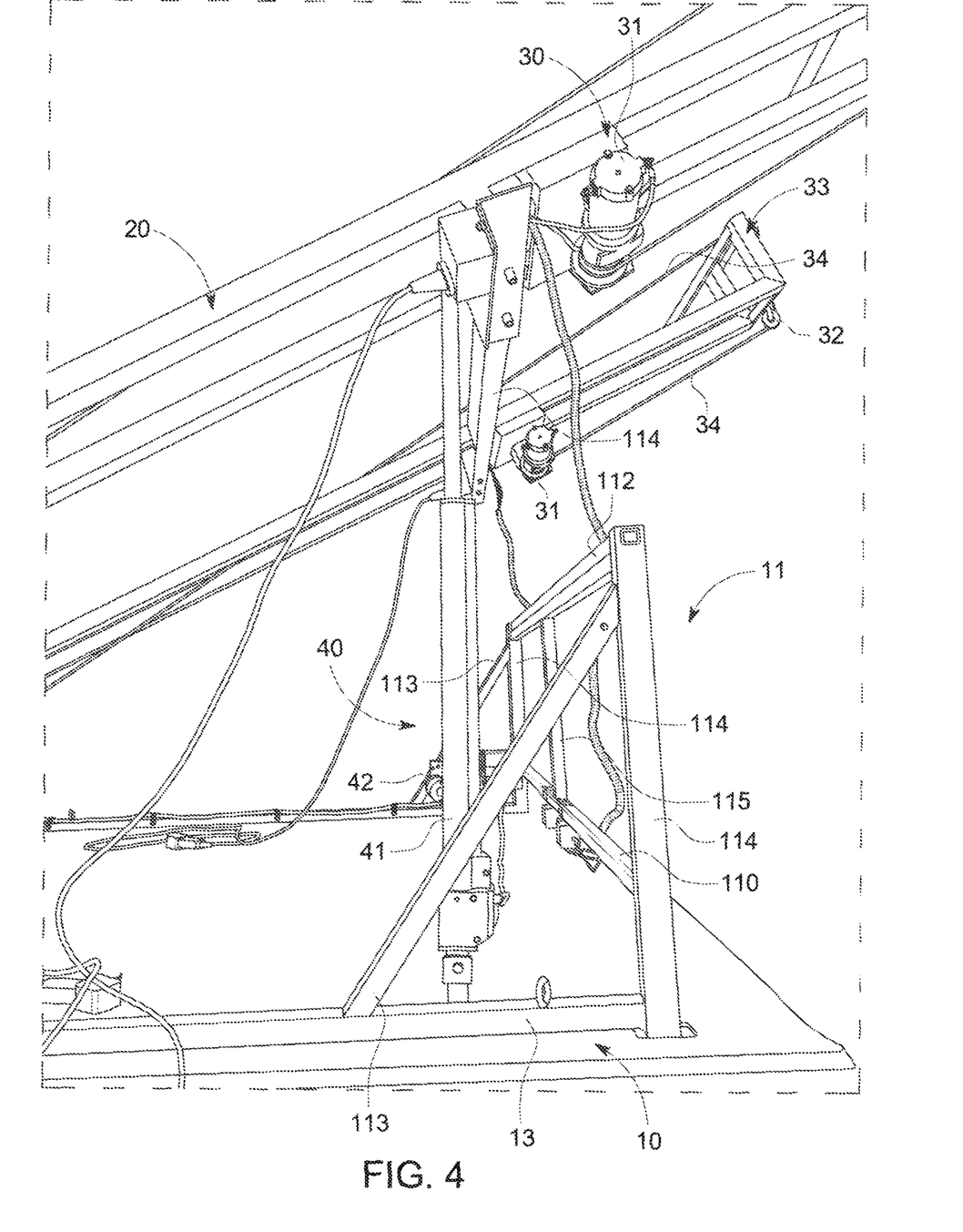
FIG. 4 is another peripheral view of the front end of the embodiment of FIG. 1.

As shown particularly in FIG. 4, the front frame 11 of the disclosed technology may include a pair of front supporting vertical posts 114 affixed on opposing ends of a front horizontal lower support rail 110 and a front horizontal upper support bar 112, wherein the front supporting vertical posts are each affixed at a lower portion thereof to one end of one of the side rails 13.

The front frame 11 further may include one or more vertical posts 115 secured between the front horizontal lower support rail 110 and the front horizontal upper support bar 112 to add further strength to the structure of the front frame; in these and other embodiments, diagonal or other bracing structure may be used to further support and strengthen the front frame.

Figure 5:
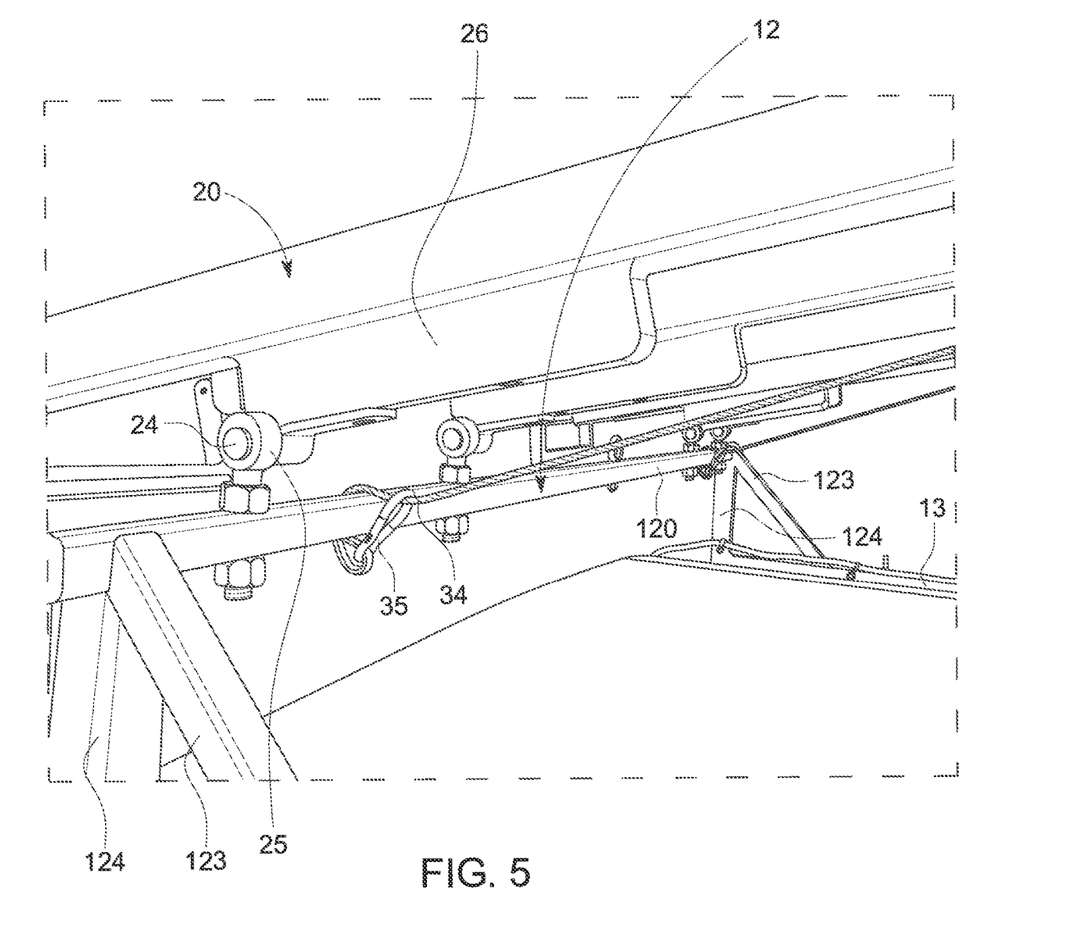
FIG. 5 is a peripheral view of the back end of the embodiment of FIG. 1.

As shown in particular in FIG. 5, the back frame 12 includes a pair of back supporting vertical posts 124 and a back horizontal support rail 120, with the back supporting vertical posts affixed at opposing ends of the back horizontal support rail 120, and wherein the back supporting vertical posts are each affixed at a lower portion thereof to another end of one of the side rails 13.

To ensure stability of the support frame, bracing bars 113, 123 may be provided where the side rails are affixed to the vertical posts of the front and back frames. As shown in the embodiment of FIG. 4 in particular, the front bracing bars 113 are affixed at one end to a side rail, and at the other end to an upper portion of the front supporting vertical posts 114. Similarly, as shown in FIG. 5 in particular, the back bracing bars 123 are affixed at one end to a side rail, and at the other end to an upper portion of the back supporting vertical posts 124.

In order to accommodate different sized truck beds, length adjustability of either or both of the front and back support frames 11, 12 may be provided, for example, by telescoping elements; likewise, if desired, the side rails 13 may be provided as telescoping elements. For example, each of the front horizontal lower support rail 110 and the front horizontal support bar 112, and/or the back horizontal support rail 120 as well as, in some embodiments, the side rails 13, may each be provided as two (or more) tubular structures, wherein the first tubular structure has an outer diameter at an end smaller than the inner diameter of the second tubular structure such that the reduced diameter portion of the first tubular structure may be adjustably and partially received within the interior of the second tubular structure. To support the stability of the support frame, when a pair of tubular structures are adjusted to a desired length, a locking pin or bolt may secure the pair of tubular structures through aligned apertures of the pair of tubular structures. Alternatively, the front horizontal upper and lower support rails may be secured through apertures of the front supporting vertical posts, and the back support rail may be secured through apertures of the back supporting vertical posts, thereby allowing the front and back supporting vertical posts to be positioned along the length of the front and back horizontal rails.

In the embodiment shown in FIGS. 1, 2, 6A and 7, the kayak support structure 20 includes a pair of telescoping rails 21 rotatably coupled with the support frame 10 of a truck mountable kayak loader and carrier of the disclosed technology. Secured to a first end of, and between, the telescoping rails of the kayak support structure is a winch support structure 22 including a pair of winch support vertical posts 221 affixed on opposing sides of a pair of winch support horizontal posts 222 (upper and lower). As with other elements of the disclosed technology, to provide added stability winch support bracing bars 223 may be affixed at one end to an upper portion of each of the winch support vertical posts 221 and at the other end to a corresponding telescoping rail.

Secured to a second end of, and between, the telescoping rails of each kayak support structure is a pull bar 23, the pull bar being positioned below the plane of the telescoping rails such that when a kayak is loaded or unloaded from the kayak support structure, as hereinafter described, the bottom of the kayak either does not contact the pull bar, or if it contacts the pull bar in doing so it does not significantly rise out of its seated engagement on the telescoping rails, thereby allowing easy and controlled loading and unloading of kayaks on and from the truck mountable kayak loader and carrier of the disclosed technology.

Figure 7:
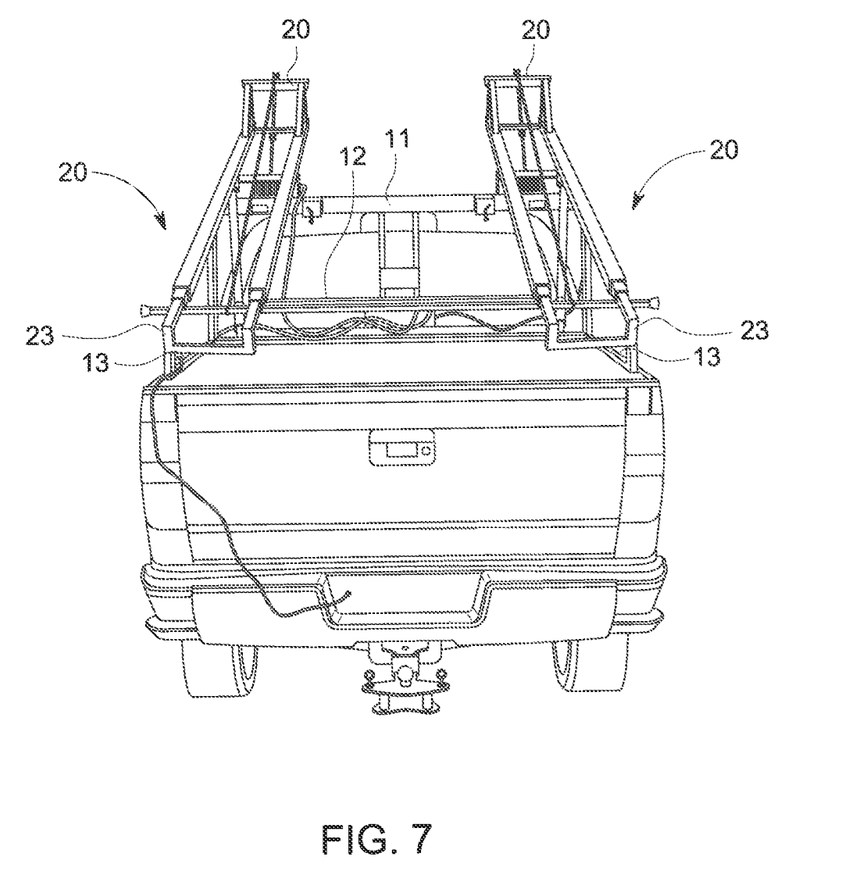
FIG. 7 is a front view of the embodiment of FIG. 1, shown in the lowered and retracted positions.

Using the pull bar, the telescoping rails may be extended to an "extended position" (see, e.g., FIGS. 1 and 2); likewise, the pull bar may be used to retract the telescoping rails into a "retracted position" (see, e.g. FIG. 7). To stop the segments of the telescoping rails from separating when being extended, interior structure may be provided on the interior of an outer segment and the exterior of an inner segment, to stop the inner segment from extending beyond a certain extendable position.

As shown in FIG. 5, the kayak support structure 20 may be rotatably affixed to the back horizontal support rail 120 of the back frame 12, by means of for example, eye bolts 25, wherein a round bolt or post 24 is secured on one end to an undersurface of the telescoping rails 21 and on the other end to the aperture of the eye bolt such that the round bolt may rotate within but is not removable from the eye bolt. In some embodiments, the round bolt or post may be provided with a threaded end to be received within a threaded end of a nut when installed on the eye bolt, thereby securing the round bolt or post within the aperture of the eye bolt. In some embodiments, additional support structure 26 may protrude from the bottom surface of the telescoping rail to support the round bolt a distance below the plane of the telescoping rail. In another configuration, tubes may be secured under each of the telescoping rails, aligned with and receiving the horizontal support rail 123 of the back frame, allowing the tubes to rotate about the support structure.

Further, to cause and control rotational movement and positioning of the kayak support structure 20 relative to the support frame 10, a powered telescoping cylinder 40 with a motor, an air compressor or a hydraulic pump 42, is provided for each kayak support structure 20. As shown in particular in FIG. 4, the telescoping cylinder may be rotatably affixed at its lower end directly or indirectly to the support frame, and rotatably affixed at its upper end to an outside telescoping rail 21 of the kayak support structure. Rotatable affixation may be accomplished by means of, for example, a post and a trunnion bracket, the post being positioned through a corresponding bore at each of the ends of the telescoping cylinders, with its ends secured within the trunnion bracket. Other means of rotatably affixing the ends of the telescoping cylinder to the frame and the kayak support structure, respectively, may be used as well.

The powered telescoping cylinder 40 may be an electric linear drive, an electric cylinder, a pneumatic cylinder system, or a hydraulic cylinder system. Operation of the powered telescoping cylinders may be controlled by a motor, a motorized compressor, or a hydraulic pump, provided as an integral part of the telescoping cylinders or as a separate unit. Notably, when multiple kayak support structures are provided, each may have its own motor, air compressor, or hydraulic pump, or a single motor, air compressor or hydraulic pump may operate the telescoping cylinders associated with each of the kayak support structures.

When the telescoping cylinders are fully extended (see, e.g., FIGS. 1-4), the kayak support structure is in a "raised position" relative to the support frame 10; when the telescoping cylinders are fully retracted (see, e.g., FIG. 7), the kayak support structure is in a "lowered position" relative to the support frame 10.

As shown in multiple figures, especially FIG. 4, a winch system 30 is provided with each of the kayak support structures to facilitate the loading and unloading of kayaks to the kayak support structure 20. The winch system includes a motorized pulley drum 31, a lower pulley 32, an upper pulley 33, and a cable 34, wherein one end of the cable is secured to the pulley drum, winds about the lower and upper pulleys, and terminates with a clip 35, such as a carabineer clip. In this configuration, winding the pulley drum in one direction extends the length of workable cable, and winding it in the opposite direction shortens the length of workable cable.

The pulleys used in the disclosed technology should allow the cable to freely wind therethrough, while securing the cable within the system such that it is not inadvertently removed therefrom, with the lower pulley being secured to the lower horizontal post of the winch support structure, and the upper pulley being secured to the upper horizontal post of the winch support structure. The motorized pulley drum may be secured to the underside of a depressed seat 36, positioned below and between the telescoping rails of a kayak support structure, such that in loading and unloading the kayak the bottom of the kayak either does not contact the top surface of the depressed seat, or if it contacts the top surface it does not rise out of its seated engagement on the telescoping rails.

Electricity and control of the telescoping cylinder system and of the motorized pulley drum of the winch system is provided by means of electrical cabling, coupled with for example the electrical outlet provided on the rear of the truck. Each of these components may be operated by one or more wired or wireless hand control 60, selectively supplying power to the elements and thereby directing the operation thereof as herein described.

Figure 6A:
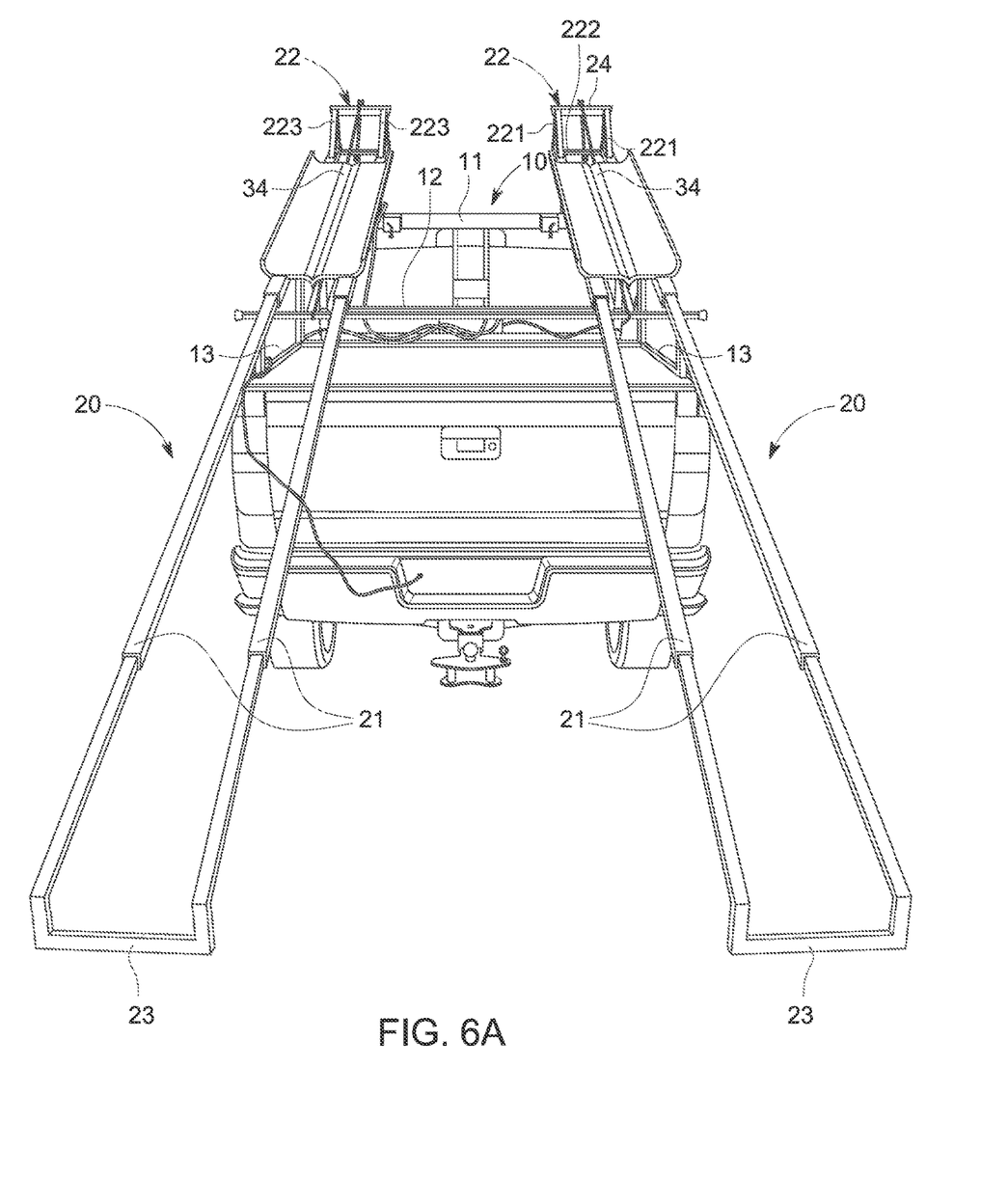
FIG. 6A is a front view of an embodiment of the truck mountable kayak loader and carrier of the disclosed technology, with a sled installed on the kayak support structure.
Figure 6B:
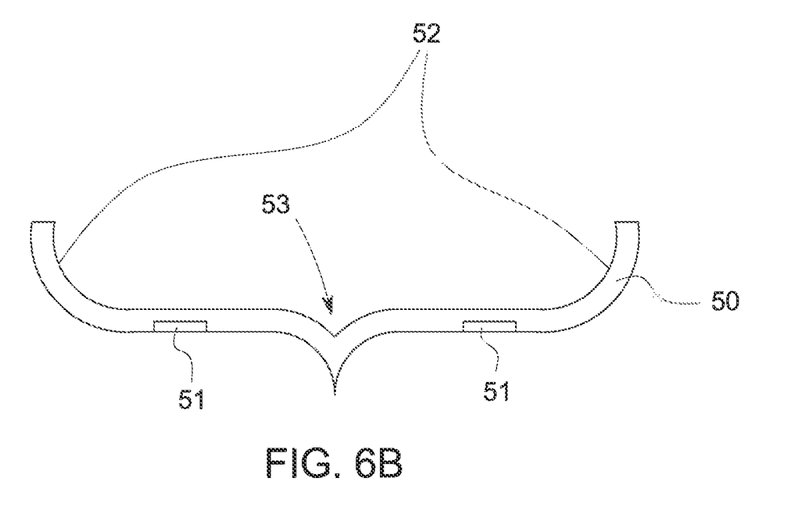
FIG. 6B is an end view of the sled shown in FIG. 6A.

In some embodiments, the telescoping rails are sized and distanced to be positioned in receiving cavities which run on the underside of the length of a kayak; in other embodiments, such as shown in FIGS. 6A and 6B, a kayak sled 50 may be secured to the telescoping rails to facilitate loading and unloading of the kayak. The kayak sled may have receiving cavities 51 on its underside sized and distanced to receive and secure to the telescoping rails of a kayak support structure of the disclosed technology. The upper surface of the sled may have side walls 52 to accommodate most kayaks, and a central chasm 53 to receive the kayak hull. In embodiments, the sled may be provided as a single element, or it may be provided in two or more fragments, each fragment extending the width of and secured to the telescoping rails, positioned along the length of the telescoping rails. As a single element the sled may have a length of up to five feet or longer, when presented in fragments, each fragment may have a length of up to one foot or longer.

Figure 8:
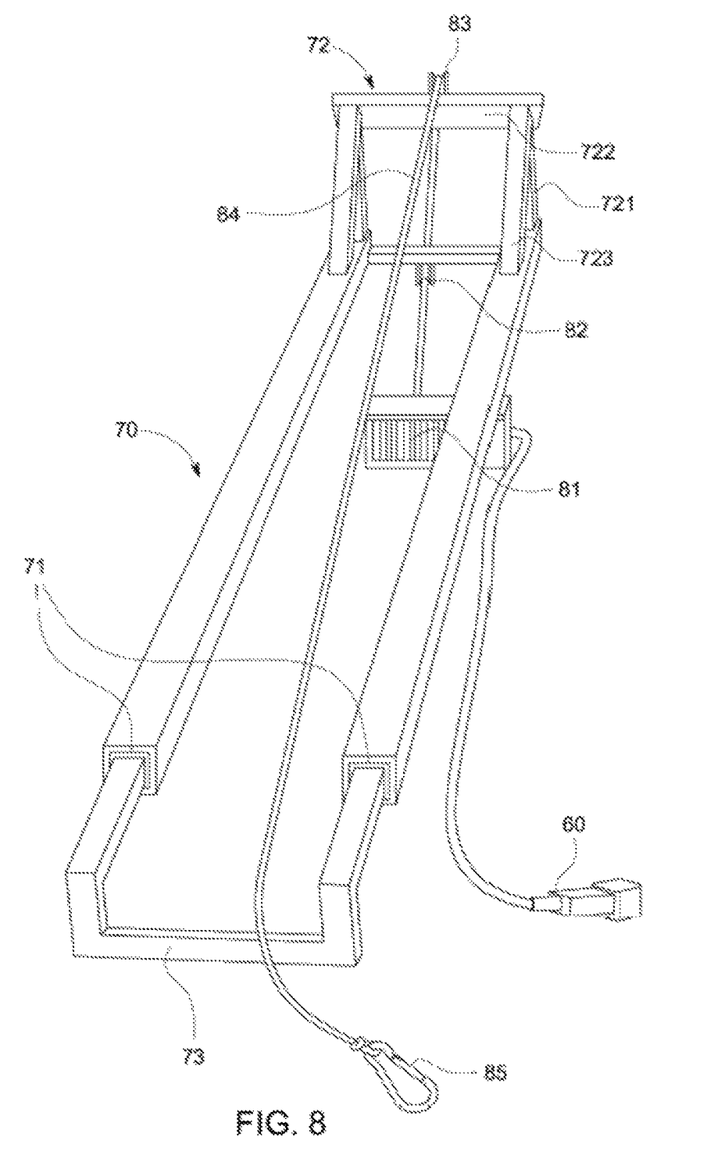
FIG. 8 depicts a kayak support structure of the disclosed technology.

As shown in FIG. 8, the disclosed technology further provides a kayak support structure which may be mounted on another transport or storage frame. As with the kayak support structure hereinabove provided with the truck mountable kayak loader and carrier, a kayak support structure 70 is provided with side rails 71, with a winch support structure 72 affixed between the rails at the upper end of the kayak support structure, and a connecting bar 73 between the rails at the lower end of the kayak support structure. The side rails may or may not be telescoping. The winch support structure 72 includes a pair of vertical posts 721, a pair of horizontal posts 722 and in some embodiments bracing bars 723 between the side rails and an upper portion of each of the vertical posts.

Mounted on the winch support structure is a winch system, including a motorized pulley drum 81. The drum may be affixed to the kayak support structure, or a portion of the transport or storage frame upon which it is mounted. The winch system further includes a lower pulley 82, centrally affixed to the lower horizontal post, and an upper pulley 83 affixed to the upper horizontal post. A cable 84 of the winch system is secured at one end to the motorized pulley drum, and extends through the lower and upper pulleys, terminating in a clip 85 that can be secured to a handle on a kayak.

As hereinabove described for the truck mountable kayak loader and carrier, the kayak support structure 70 may be provided with a sled as a single element or in fragments, affixed to the side rails.

The kayak support structure may be mounted on the transport or storage frame in a manner so that it is in a stationary position, or it may be rotatable about the frame by means of a telescoping cylinder, which may be powered or may be manually adjusted. When powered, the telescoping cylinder may be an electric linear drive, an electric cylinder, a pneumatic cylinder system, or a hydraulic cylinder system. Operation of the powered telescoping cylinders may be controlled by a motor, a motorized compressor, or a hydraulic pump, provided as an integral part of the telescoping cylinders or as a separate unit.

As herein described, multiple components are referred to as "rails", "bars" and "posts"; while these terms normally may mean different element structure, this is not intended, and any of these structures may be hollow (or solid or partially solid, depending on its functionality), with a round or rectangular circumference. Further, various components are described herein as being affixed to other components, which can be accomplished as an integral unit, through welding, through posts and apertures, or through any other means for affixing the applicable components as described.

The truck mountable kayak loader and carrier of the disclosed technology may be mounted on the bed of a truck by securing the side rails to the sides of the truck, by means of for example clamps secured to a flange protruding from the lower interior edge of each of the side rails, or by bolts secured through apertures of the side rails to the side walls of the bed. Other known or hereinafter developed means for securing the side rails to apertures of the side walls of the truck bed may also be used. If adjustable front and back frames are provided, and/or side rails, the same are adjusted and secured to allow the loader and carrier to fit securely on the side walls of the truck bed. Finally, electricity is supplied to the motor, air compressor or hydraulic pump of the telescoping cylinder and to the motorized pulley drum.

To load a kayak using the truck mountable kayak loader and carrier of the disclosed technology, the kayak support structure 20 is moved to the raised position relative to the support frame, by means of the telescoping cylinders operated by wired or wireless hand controls 60, and the telescoping rails are likewise moved to their extended position. The kayak is then aligned with the kayak support structure 30, and the carbineer 35 or other securing means of the winch system is affixed to the front pull handle of the kayak. Through the use of the wired or wireless controls, power is supplied to the pulley motor and the pulley motor winds the cable about the drum, shortening the cable of the winch system, thereby pulling the kayak onto the kayak support structure (either directly, or onto a kayak sled 50, if provided). Once the kayak is pulled by means of the winch system into close proximity to the winch support structure of the kayak support structure (on the rails or a sled, if provided), the telescoping rails are moved to their retracted position by pushing the pullbar in, and the kayak support structure is moved to the lowered position relative to the support frame by retracting the telescoping cylinders. Straps are used to secure the kayak to the carrier in this position, and the vehicle is now prepared for travel.

Similarly, to unload a kayak using the mountable kayak loader and carrier of the disclosed technology, any kayak straps are removed, and the kayak support structure 20 is moved from the lowered position to the raised position, relative to the support frame, by means of operation of the motor, air compressor or hydraulic pump of the telescoping cylinders, and the telescoping rails are likewise moved to their extended position by pulling the pull bar out. The motorized pulley drum is then operated to extend the cable, allowing the kayak to be lowered along the telescoping rails until the back end thereof reaches the ground/water. The carbineer can then be removed from the kayak handle, and the kayak may be moved for use.

When the kayak support structure 70 is mounted on a transport or storage frame, a kayak is aligned with the kayak support structure 70, and the carbineer 85 or other securing means of the winch system is affixed to the front pull handle of the kayak. Through the use of wired or wireless controls, or a switch or like control mechanism on the motor, power is supplied to the pulley motor and the cable of the winch system is shortened, thereby pulling the kayak onto the kayak support structure (either directly, or onto a kayak sled 50, if present). To unload a kayak from the support structure, the motorized pulley drum is operated to extend the cable, allowing the kayak to be lowered on the side rails until the back end thereof reaches the ground/water. The carbineer can then be removed from the kayak handle, and the kayak may be moved for use.

Figure 9:
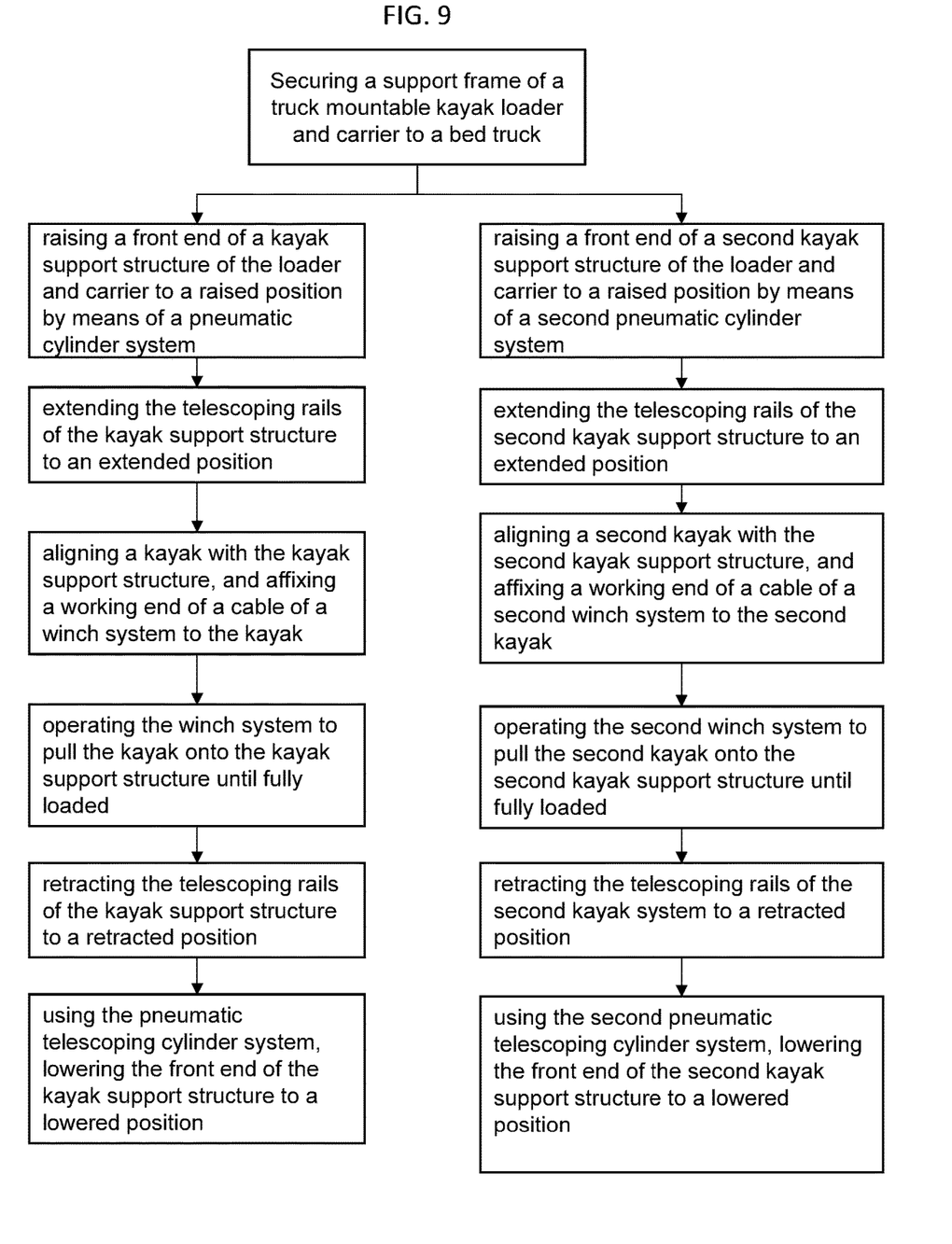
FIG. 9 shows a method of loading a kayak on a truck bed.

As shown in FIG. 9, with the afore-described truck bed mountable kayak loader and carrier, a method of loading a kayak on a pickup truck bed is provided. Specifically, in this method a truck mountable kayak loader and carrier as herein disclosed, through embodiments, is secured to a truck bed. Once secured, the telescoping cylinder system is operated to raise a front end of the kayak support structure to a raised position, and using the pull bar the telescoping rails are extended into an extended position. A kayak is then aligned with the kayak support structure, and a working end of the cable of a winch system is secured to the kayak. Using the winch system, the kayak is then pulled onto the kayak support system until it is fully loaded. The telescoping rails of the kayak support system are then retracted into their retracted position, and the telescoping cylinder system is lowered to its lowered position. Straps may be used to secure the kayaks to the kayak support structure, the vehicle, or the frame prior to transport. This process may be repeated or synchronized with the loading of a second kayak onto a second kayak support system, if provided with the truck mountable kayak loader and carrier.

Figure 10:
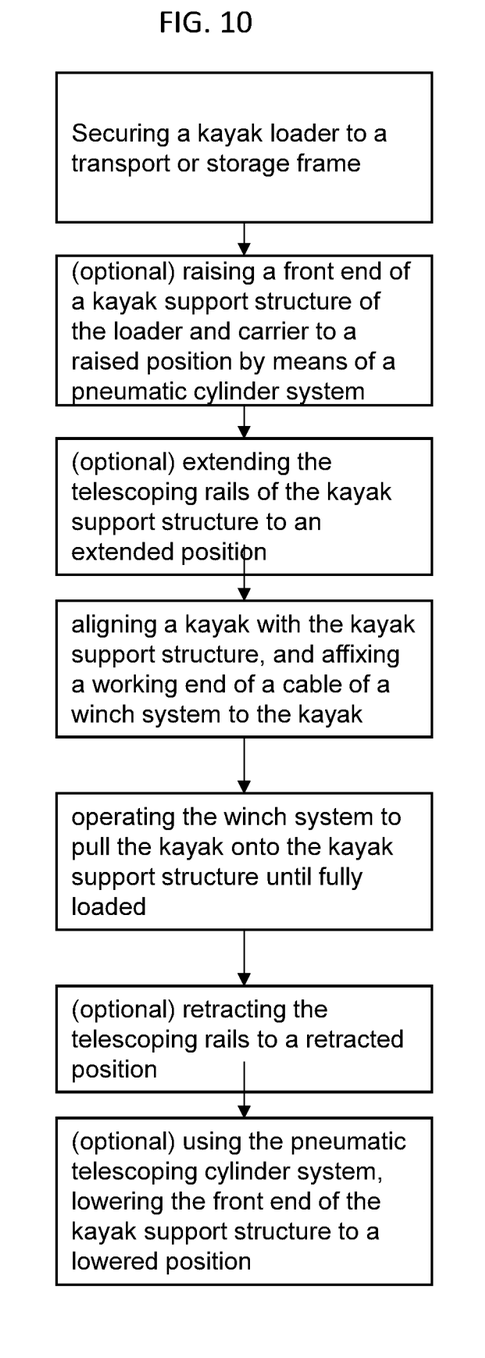
FIG. 10 shows a method of loading a kayak on a kayak support structure.

Similarly, as shown in FIG. 10, when a kayak support structure 70 is mounted on a transport or storage frame, a method of loading a kayak on the kayak support structure is provided. Specifically, in this method a kayak may be aligned with the kayak support structure, and a working end of a cable of a winch system integral with the kayak support structure is secured to the kayak. Using the winch system, the kayak is then pulled onto the kayak support structure until it is fully loaded. Straps may be used to secure the kayaks to the kayak support structure and/or the frame for transport or storage.

The invention claimed is:

1. A truck mountable kayak loader and carrier comprising:
a support frame comprising a front frame, a back frame, and a pair of side rails, wherein the front frame and the back frame are respectively affixed to opposing ends of the side rails;
a kayak support structure affixed to the back frame by means of a pair of eyebolts, with a post secured laterally to an undersurface of the kayak support structure, the post being received within the eyebolts thereby facilitating and supporting rotation of the kayak support structure about an axis above the back frame, the kayak support structure further having a pair of concentrically telescoping rails, with a winch support structure secured at and between one of the ends of the telescoping rails and a pull bar secured at and between the other ends of the telescoping rails, and wherein the pull bar is positioned below a plane of the telescoping rails;

a telescoping cylinder system affixed at one end to the support frame, and affixed at the other end to the kayak support structure, wherein when the telescoping cylinder moves between a first position and a second position, said movement causes the kayak support structure to rotate relative to and above the back frame, which in tandem shifts the center of gravity of one or more kayaks loaded on the kayak support structure; and a winch system supported on the winch support structure, the winch system comprising a motorized pulley drum, and a cable, wherein one end of the cable is secured to the motorized pulley drum, and the other end of the cable terminates with a clip, wherein winding the pulley drum in one direction extends the length of workable cable, and winding the pulley drum in the opposite direction shortens the length of workable cable.

2. The truck mountable kayak loader and carrier of claim 1, wherein the front frame includes a pair of front supporting vertical posts, a front horizontal lower support rail affixed at each end to one of the front supporting vertical post, a front horizontal upper support bar also affixed to each of the front supporting vertical posts, and wherein each of the front supporting vertical posts are affixed at a lower portion thereof to one or the other of the side rails, respectively; and wherein the back frame includes a pair of back supporting vertical posts with a back horizontal support rail extending between the back supporting vertical posts, and wherein each of the back supporting vertical posts are affixed at a lower portion thereof to one or the other of the side rails, respectively.

3. The truck mountable kayak loader and carrier of claim 2, wherein the front frame further includes one or more interior vertical posts secured between the front horizontal lower support rail and the front horizontal upper support bar.

4. The truck mountable kayak loader and carrier of claim 2, wherein the front horizontal lower support rail, the front horizontal upper support bar, and the back horizontal support rail are adjustable lengthwise.

5. The truck mountable kayak loader and carrier of claim 2, wherein the front frame further includes a pair of front bracing bars, each front bracing bar secured at one end to an upper portion of one of the front supporting vertical posts and at the other end to the corresponding side rail to which said front supporting vertical post is affixed; and wherein the back frame includes a pair of back bracing bars, each back bracing bar being secured at one end to an upper portion of one of the back supporting vertical posts and at the other end to the corresponding side rail to which said back supporting vertical post is affixed.

6. The truck mountable kayak loader and carrier of claim 1, wherein the winch support structure comprises a pair of winch support vertical posts, each winch support vertical post extending vertically from one end of one of the telescoping rails, and further comprises a winch horizontal upper support rail affixed to and between the top of the winch vertical posts.

7. The truck mountable kayak loader and carrier of claim 1, wherein the telescoping cylinder system is affixed to the kayak support structure at one of the telescoping rails.

8. The truck mountable kayak loader and carrier of claim 1, further comprising a kayak sled affixed to the telescoping rails.

9. The truck mountable kayak loader and carrier of claim 8, wherein the kayak sled has receiving cavities on its underside sized and distanced to receive the telescoping rails of the kayak support structure.

10. The truck mountable kayak loader and carrier of claim 1, further comprising a second kayak support structure rotatably affixed to the back frame of the support frame.

11. A method of loading a kayak on a truck bed, the method comprising the steps of:

securing a support frame of a truck mountable kayak loader and carrier to a truck bed, the support frame comprising a front frame, a back frame, and a pair of side rails, wherein the front frame and the back frame are respectively affixed to opposing ends of the side rails, wherein the truck mountable kayak loader and carrier further comprises:

a kayak support structure affixed to the back frame, by means of a pair of eyebolts, with a post secured laterally to an undersurface of the kayak support structure, the post being received within the eyebolts thereby facilitating and supporting rotation of the kayak support structure about an axis above the back frame, the kayak support structure further having a pair of concentrically telescoping rails, with a winch support structure secured at and between one of the ends of the telescoping rails and a pull bar secured at and between the other ends of the telescoping rails, and wherein the pull bar is positioned below a plane of the telescoping rails;

a telescoping cylinder system affixed at one end to the support frame, and affixed at the other end to the kayak support structure; and a winch system comprising a cable and supported on the kayak support structure, the winch system comprising a motorized pulley drum and a cable;

using the telescoping cylinder system, raising a front end of the kayak support structure to a raised position, thereby shifting the center of gravity and causing the rear end of the kayak support structure to rotate about a linear axis above the back frame;

using the pull bar, extending the telescoping rails to an extended position;

aligning a kayak with the kayak support structure, and affixing a working end of the cable of the winch system to the kayak;

operating the winch system to pull the kayak onto the kayak support structure until it is fully loaded on the kayak support structure;

retracting the telescoping rails to a retracted position; and using the telescoping cylinder system, lowering the front end of the kayak support structure to a lowered position.

12. The method of claim 11, wherein the front frame and the back frame have adjustable lengths, and wherein the method further comprises adjusting the lengths of the front frame and the back frame such that the rails may be secured to the sides of the truck bed.

13. The method of claim 11, wherein the kayak support structure further comprises a kayak sled upon which the kayak is loaded.

14. The method of claim 13, wherein the kayak sled has receiving cavities on its underside sized and distanced to receive the telescoping rails of the kayak support structure.

15. The method of claim 11, the method further comprising the steps of:
providing a second kayak support structure having telescoping rails and a second winch system having a second cable, said second kayak support structure being rotatably affixed to the back frame of the support frame of the truck mountable kayak loader and carrier by means of a pair of eyebolts, with a post secured laterally to an undersurface of the second kayak support structure, the post being received within the eyebolts thereby facilitating and supporting rotation of the second kayak support structure about an axis above the back frame;
using a second telescoping cylinder system, raising a front end of the second kayak support structure to a raised position, thereby shifting the center of gravity and causing the rear end of the kayak support structure to rotate about a linear axis above the back frame;
extending the telescoping rails of the second kayak support structure to an extended position by pulling the pull bar of the second kayak support structure;
aligning a second kayak with the second kayak support structure, and affixing a working end of the second cable of the second winch system to the second kayak;
operating the second winch system to pull the second kayak onto the second kayak support structure until it is fully loaded on the second kayak support structure;
retracting the telescoping rails of the second kayak support structure to a retracted position; and
using the second telescoping cylinder system, lowering the front end of the second kayak support structure to a lowered position, causing the rear end of the second kayak support structure to rotate about a linear axis above the back frame.

16. A kayak loader for loading kayaks onto a kayak carrier or storage structure, the kayak loader comprising:
a kayak support structure having a pair of concentrically telescoping rails, with a winch support structure secured at and between one of the ends of the rails; and
a winch system supported on the winch support structure, the winch system comprising a motorized pulley drum and a cable, wherein one end of the cable is secured to the motorized pulley drum and terminates with a clip, wherein winding the pulley drum in one direction extends the length of workable cable, and winding it in the opposite direction shortens the length of workable cable;
a telescoping cylinder system affixed to a first end to the kayak support structure; and
a support frame having a back frame comprising a back horizontal support rail, wherein the kayak support structure is affixed at a second end to the back frame such that movement of the telescoping cylinder causes the kayak support structure to rotate about a linear axis above the back horizontal support rail.

17. The kayak loader of claim 16, further comprising a kayak sled having receiving cavities on its underside sized and distanced to receive the rails of the kayak support structure.

18. The kayak loader of claim 16, wherein the winch structure comprises a pair of winch support vertical posts, each winch support vertical post extending vertically from one end of one of the telescoping rails, and further comprises a winch horizontal upper support rail affixed to and between the top of the winch vertical posts.

* * * * *